Dec. 13, 1960

O. K. KELLEY ET AL 2,963,923

ACCESSORY DRIVE

Filed June 18, 1958

INVENTORS
Oliver K. Kelley &
Stanley L. Buckay
BY
W. C. Middleton
ATTORNEY

United States Patent Office 2,963,923
Patented Dec. 13, 1960

2,963,923
ACCESSORY DRIVE

Oliver K. Kelley, Bloomfield Hills, and Stanley L. Buckay, Birmingham, Mich., assignors to General Motors Corporation, Detroit, Mich., a corporation of Delaware Filed June 18, 1958, Ser. No. 742,821

8 Claims. (Cl. 74—752)

This invention relates to engine accessory drives and more particularly to engine accessory drives for motor vehicle engines.

Present day motor vehicles utilize many engine driven accessories that require high speed operation when the engine is operating at a low speed and are required to maintain this speed constant over the whole range of engine speeds. Accessories of this type include fans, air conditioning compressors, air suspension compressors, generators and engine flywheels.

To operate these types of accessories at a speed considerably greater than the idle speed of the engine requires an overdrive ratio drive. At higher engine speeds it is desirable that the accessories have a maximum governed speed which will not be exceeded even though the engine rotates many times faster than its idle speed and, consequently, some means for reducing the overdrive ratio and eventually releasing the drive to the accessory after the accessory has reached its maximum governed speed, is advantageous. On starting the engine it is also desirable that the accessory load be applied in a gradual manner so as to relieve the starter from such loads and to provide for shockless gradual drive of the accessories by the engine.

In order to prevent accessory overspeed, for example in case of failure of the drive releasing means, it also is desirable to provide means for preventing such overspeed, by connecting the accessory directly to the engine thereby rendering the overdrive ineffective.

It is therefore an object of this invention to provide an automatic accessory drive whereby when the engine is rotating at a slow idle speed the accessory is overdriven and gradually brought up to a maximum governed speed.

It is a further object to provide an accessory drive in which the drive ratio is decreased above a predetermined accessory speed to maintain such predetermined accessory speed.

It is still a further object of the invention to provide a geared flywheel for an internal combustion engine wherein the flywheel is gradually brought up to a relatively high speed when the engine is idling to store up kinetic energy, and to return that energy to the engine if the engine speed drops below the normal idle speed.

These and other objects and advantages will be readily apparent from the following description and the accompanying drawings wherein.

In general, the preferred embodiment which illustrates the invention applied to an inertia flywheel drive, includes a planet gear carrier continually connected to a shaft that is continuously driven by the engine at some fixed speed ratio relative thereto, the planet carrier having pinions thereon that mesh with a slipping reaction type ring gear and an output sun gear that is continually connected to an inertia flywheel mass. The reaction ring gear is normally held from rotation by spring applied frictional means and released by a piston actuated by centrifugal hydraulic pressure generated within the rotating inertia mass. A one-way device provides for holding the ring gear against reverse rotation to provide torque transmission from the flywheel mass to the input shaft when the input shaft rotates below a predetermined speed. A safety lock-up clutch is also provided wherein if the speed of the inertia mass and, hence, the centrifugal pressure generated increases above a predetermined point, the reaction ring gear is clutched directly to the sun gear thereby providing a 1:1 drive between the inertia mass and the engine connected shaft.

Figure 2:
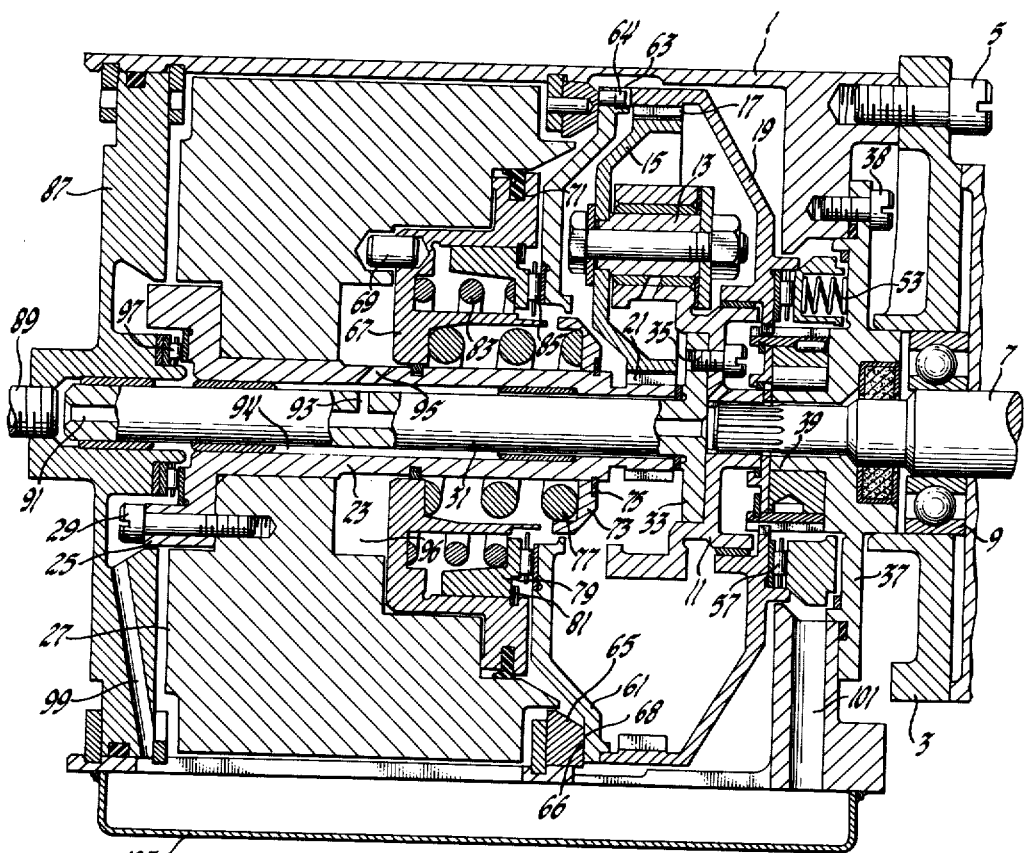
Figure 2 is a cross-sectional view of the device showing details thereof.

Referring now to Figure 2, which shows a specific illustration of the invention applied to an engine flywheel drive, the drive is enclosed within a case member 1 fastened to a support member 3 by bolts 5. The support member 3 in a motor vehicle might conveniently be the generator housing. An input shaft 7 is journalled within the member 3 by bearings 9. Shaft 7 could be the generator shaft or an extension thereof. Splined on the end of the shaft 7 is a planet carrier member 11 in which one or more planet pinion shafts 13 are journalled, each shaft 13 carrying a pinion gear 15. The pinion gears 15 mesh with a ring gear 17 and with a sun gear 21. The ring gear 17 is of the floating type, that is it is free to move axially, and includes a flange portion 19. The sun gear 21 is formed on the end of a sleeve shaft 23 which has a flange 25 held by bolts 29 to a relatively large inertia flywheel weight 27. An inner shaft 31 has a flange portion 33 fastened to the carrier 11 by bolts 35 to form an extension of the carrier 11.

Surrounding the input shaft 7 is a reaction plate member 37 fastened to the case member 1 by bolts 38. As seen more clearly in Figures 3 and 4, the reaction plate 37 has an axially extending hub portion 39 forming an inner race of a freewheel roller device, generally indicated by F. The freewheel device F includes, in addition to the inner race 39, a plurality of rollers 41 enclosed within an outer race 43 in turn enclosed within an externally splined sleeve member 47. One or more key pins 45 act to prevent outer race 43 from rotating relative to sleeve 47. A roller retainer member 49 is held in place by snap ring 51 and acts to hold the freewheel device F in assembly.

The reaction ring gear flange 19 has internal teeth 52 that engage the spline teeth on portion 47 of the freewheel device F. The ring gear flange 19 is continually urged to the left as viewed in Figures 2 and 3 by a plurality of coil springs 53 that react against plate 37. The springs 53 are enclosed within a spring retainer member 55. The springs 53 acting through retainer 55 and a needle thrust bearing 57 act on the reaction ring gear flange 19 to normally urge it to the left. A stop ring 59 acts to limit movement of the spring cage 55 and, hence, ring gear flange 19 to the right.

The ring gear 17 has an axial opening 63 that engages with a pin 64 formed on a thrust and brake flange member 61. A ring shaped brake plate 65, which may be formed of any suitable material, but which in the preferred embodiment is formed of aluminum, is fastened by any suitable means to the case member 1. The brake plate 65 has a surface 66 that provides a friction brake area that is normally engaged by a corresponding area 68 on the thrust and brake flange 61 which may be formed of hardened steel.

Flywheel weight 27 has a hollowed out portion that forms a cylinder for a main piston member 67. Piston 67 is adapted to reciprocate in the inertia weight 27 but is prevented from rotation relative thereto by guide pins 69 extending into holes formed in the weight 27. A seal ring 71 carried by the piston 67 contacts the inner surface of the cylinder to prevent leakage.

Piston 67 is urged to the left as viewed in Figure 2 by a large coil spring 77 that reacts against a spring retainer ring 73 carried on the sun gear shaft 23 and held in place by snap ring 75. Reciprocably mounted within the large piston 67 is a smaller thrust piston 79. A coil spring 83 that reacts against piston 67 urges piston 79 against a snap ring 81 on piston 67. The thrust piston 79 bears against needle thrust washer 85 which in turn bears against the reaction and brake disk member 61.

An end plate member 87 is provided to close the left hand end of the case 1 and form a bearing for the end of the extension shaft 31. An oil supply pipe 89 is fitted into the end plate 87 to supply oil from any suitable source under zero or very small static pressure into a center bore 91 formed in the shaft 31. Bore 91 connects by radial passage 93 to the space 94 between shafts 31 and 23 which in turn connects by a hole 95 formed in the shaft 23 to the piston chamber 96. A needle thrust bearing 97 is provided between the end plate 87 and the sun gear shaft 23. Oil entering pipe 89 lubricates the bearing 97 and drains through a drilled passage 99 into a sump 103. Case member 1 has a similar passage 101 formed therein to drain oil used to lubricate bearing 57 from the right side of the device.

*Operation*

Operation of the device is as follows. Shaft 7 is driven at some speed proportional to the engine speed, and in the case of the illustrated embodiment, input shaft 7 is the generator shaft which might be driven at twice the engine speed. Shaft 7 drives the planet pinion carrier 11 in a forward direction and due to the large inertia of the mass 27 connected to the sun gear 21 there is a resistance to forward rotation of the sun gear 21, so that rotation of the carrier member 11 causes the planet pinions 15 to urge the ring gear 17 in a forward direction. This forward rotation of the ring gear 17 is resisted by the frictional force generated between the surface 66 on brake ring 65 and the surface 68 on the reaction and brake ring 61. The amount of this frictional force is determined by the strength of the springs 53 which act through the needle bearing 57, flange 19 and ring gear 17, to urge the braking surfaces 66 and 68 into contact. The frictional resistance to forward rotation of ring gear 17 provides torque reaction to cause the planet pinions to rotate and drive the sun gear 21 and inertia mass 27 to rotate forwardly. As the speed and momentum of sun gear 21 and weight 27 increases the reaction torque imposed on ring gear 17 decreases so that the force of springs 53 urging the brake surfaces 66 and 68 together can completely stop the forward rotation of the ring gear 17. The weight 27 then is driven by the shaft 7 through the gearing at an overdrive ratio equal to the ratio of the gearing, which for the illustrated embodiment is in the nature of seven and one-half to one. This ratio may be varied to suit the particular application. Since shaft 7 is driven at twice engine speed and as weight 27 is driven seven and one-half times the speed of shaft 7, then weight 27 is rotating at fifteen times the speed of the engine.

Since a normal engine idling speed is around 400 r.p.m. this means that the weight 27 is rotated at fifteen times 400 or 6,000 r.p.m. Since the kinetic energy of the flywheel increases as the square of the speed, a flywheel rotating at fifteen times engine speed will have energy equal to 225 times that of a similar flywheel rotating at engine speed.

During operation of the device, oil has been supplied through passages 89, 91, 93 and 95 at zero static pressure to chamber 96. This oil rotates with the weight 27 and developes a centrifugal pressure acting on piston 67 to urge it to the right as viewed in Figures 1, 2 and 3. When the centrifugal pressure of the oil increases to a point where the force of the oil acting on piston 67 is sufficient to overcome the preload of spring 77 then the piston 67, through spring 83, thrust piston 79 and roller bearing 85 begins to urge the ring 61 and ring gear 17 to the right against the springs 53 to reduce the net force acting to urge surfaces 66 and 68 together. The ring gear 17 then begins to gradually rotate forwardly, since the net frictional force between surfaces 66 and 68 is again insufficient to resist the reaction force on the ring gear imposed on it by the rotation of pinions 15 on the carrier member 11. With ring gear 17 beginning to rotate forwardly, the gear ratio between shaft 7 and the weight 27 begins to decrease.

The speed at which the gear ratio begins to decrease is determined by the preload value of spring 77 and in the illustrated embodiment wherein a flywheel is driven, the spring 77 is chosen so that its preload is overcome at a speed equal to the gear ratio times the speed of shaft 7 when the engine is idling or specifically in the example at seven and one-half times the speed of shaft 7 which would be rotating at twice engine idle speed or 800 r.p.m. This speed at which the gear ratio begins to decrease is a maximum predetermined governed speed which the accessory should not exceed. If the speed of input shaft 7 increases, the centrifugal pressure in chamber 96 will rise and exert an additional force on piston 67 to not only overcome the preload force of spring 77 but also the combined forces of springs 53, so that the net force acting on the ring member 61 to move it to the left against the brake 65 will be zero resulting in the ring gear 17 freely rotating in forward direction. With ring gear 17 freely rotating there is no reaction in the gearing and, consequently, there is no drive between the shaft 7 and the weight 27.

If the inertia weight 27 begins to slow below the maximum predetermined speed, the centrifugal pressure in chamber 96 will begin to decrease. This decreased pressure will allow spring 53 to move ring gear 17 and flange 61 to the left reengaging the brake surfaces 66—68. This causes the gearing to again transmit drive from shaft 7 to the weight 27 to bring it up to the maximum governed speed. This maximum governed speed is that speed where the centrifugal pressure of oil in chamber 96 is just sufficient to act on piston 67 with enough force to just overcome the combined force of spring 77 and springs 53. Braking surfaces 66 and 68 are then urged together by a zero force. Any speed above the maximum governed speed will cause the surfaces 66 and 68 to separate further, while any speed below the maximum governed speed will cause the surfaces 66 and 68 to reengage and re-establish torque transmission between shaft 7 and weight 27.

The flywheel weight 27 is designed to return energy to the engine whenever the speed of input shaft 7 drops below the speed of weight 27 divided by the ratio of the planetary gearing. If the weight 27 is rotating at its maximum governed speed of say 6,000 r.p.m. and the speed of shaft 7 drops below 6,000 divided by seven and one-half or 800 r.p.m., torque will be transmitted from the flywheel to the shaft 7 and from there to the engine. This reverse direction of torque transmission is obtained through the gearing with the one way device F acting to prevent reverse rotation of ring gear 17. With sun gear 21 driven forwardly by weight 27 and ring gear 17 held against reverse rotation, carrier member 11 is caused to rotate forwardly at a reduced speed and increased torque. This transfer of torque from weight 27 to shaft 7 and the engine prevents engine stalling and acts to maintain the engine speed at its predetermined normal value.

Since shaft 7, in the illustrated example, is connected to the engine through a two to one ratio drive, for example a pulley belt drive, the minimum speed of 800 r.p.m. for shaft 7 is equivalent to a minimum speed of 400 r.p.m. for the engine. If the invention is utilized in an embodiment not employing a flywheel, for example in a compressor drive, then the one way device F may be dispensed with since one way torque transmission is all that is required.

If, for some reason, the flange ring 61 fails to move away from the brake member 65, for example due to binding or seizure of parts in the mechanism, means are provided for limiting the speed of the weight 27 to the speed of shaft 7. If the speed of the inertia mass 27 increases above a predetermined safe limit, the centrifugal pressure in chamber 96 will be sufficient to compress the spring 83 and allow piston 67 to move to the right until the right hand surface of piston 67 contacts the reaction and brake ring 61 to clutch the weight 27 and, hence, sun gear 21 to the ring gear 17 thus locking the gearing in a 1:1 ratio condition.

This safety clutch feature is particularly important in a flywheel drive where, upon failure of the drive releasing device, the flywheel could be driven at a speed many times engine speed. In the case of a motor vehicle employing the illustrated embodiment the flywheel speed could increase to 7.5 times two times 4,500 r.p.m. or 67,500 r.p.m. At this speed the flywheel could break and cause considerable damage. The safety clutch arrangement shown limits the speed of the flywheel to two times maximum engine speed or with a maximum engine speed of 4,500 r.p.m., a maximum safe speed of 9,000 r.p.m.

Figure 1:
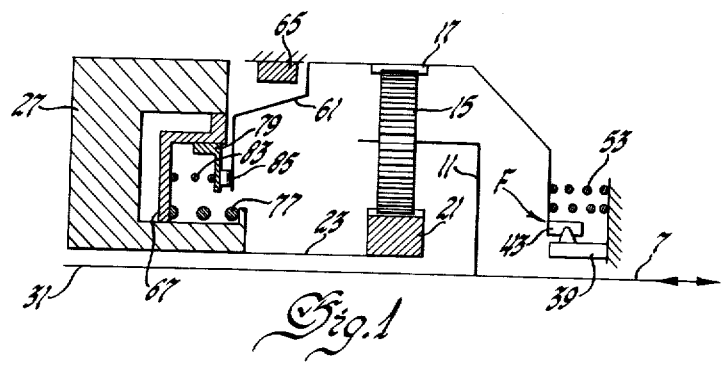
Figure 1 is a schematic illustration of the invention as applied to an inertia flywheel.
Figure 3:
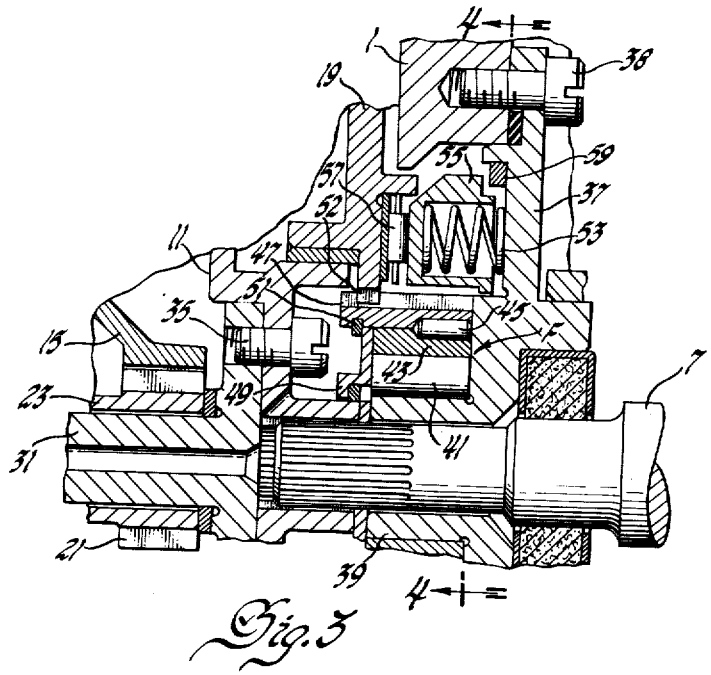
Figure 3 is an enlarged view of a portion of the device shown in Figure 2.
Figure 4:
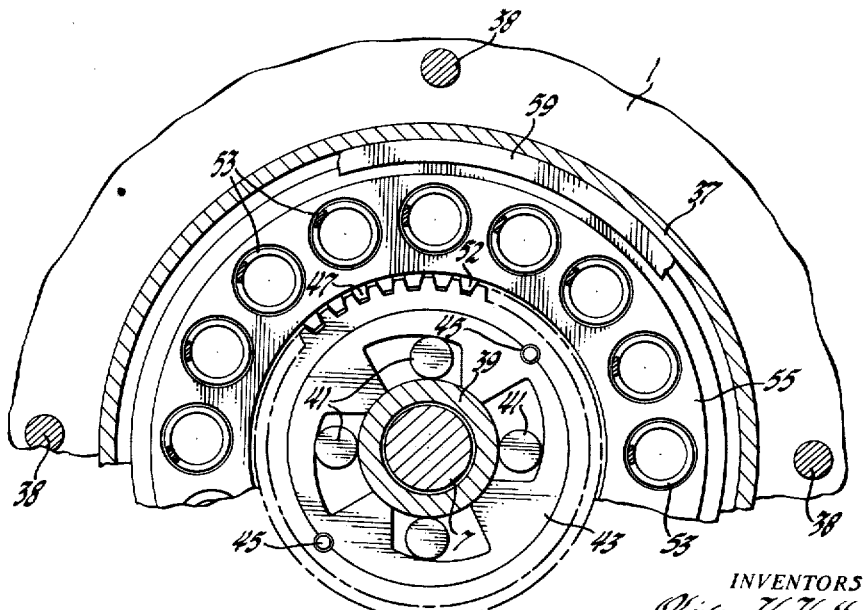
Figure 4 is a sectional view taken on the line 4—4 of Figure 3.

Figure 1 illustrates schematically the flywheel application wherein corresponding elements have been given the same numbers as parts of the detailed device shown in Figures 2, 3 and 4.

The invention may be employed in many ways in various arrangements other than the illustrated example. Many modifications will be apparent by those skilled in the art without departure from the invention which is to be limited only by the following claims.

We claim:

1. An engine accessory drive including a drive shaft and a driven shaft, a planetary gear set including a first element connected to said drive shaft, a second element connected to said driven shaft, and a third element adapted to provide reaction in said gear set for establishing torque transmitting drive between said shaft, a stationary ground member, resilient means normally urging said third element into frictional engagement with said ground member with a predetermined force to resist rotation of said third element and thereby provide torque reaction for said gearing, and means responsive to the speed of rotation of said driven shaft for opposing said resilient means to reduce the net force acting to urge said third element into said frictional engagement, whereby said third element will slip with respect to said ground element and provide reduced reaction for said gearing.

2. In a motor vehicle having an engine, a flywheel mass, change speed gearing normally conditioned to transmit drive from said engine to said mass at a speed ratio greater than one to one, first means responsive to the speed of said mass and connected to said gearing for reducing the speed ratio as the speed of the mass increases, and additional means independent of said first means connected to said gearing for establishing drive from said mass to said engine at a speed ratio less than one to one.

3. In a motor vehicle having an engine, a flywheel mass, change speed gearing normally conditioned to transmit drive from said engine to said mass at a speed ratio greater than one to one, first means responsive to the speed of said mass and connected to said gearing for gradually reducing the speed ratio as the speed of the mass increases, second means responsive to the speed of said mass and connected to said gearing for establishing a one to one ratio between the engine and said mass, and means independent of said first and second means connected to said gearing for establishing drive from said mass to said engine at a speed ratio less than one to one.

4. An accessory drive including a planetary gear set having an input element, an output element and a reaction element, friction means for resisting rotation of said reaction element, resilient means for applying said friction means with a predetermined force to resist rotation of said reaction means to provide a predetermined maximum reaction for said gearing, and means connected to said friction means and responsive to rotation of said output element at a speed greater than a predetermined speed for variably opposing said resilient means with a force dependent on said speed to gradually reduce the resistance to rotation of said reaction means as the speed of said output element increases and thereby reduce the reaction in said gearing below said predetermined maximum.

5. An accessory drive including a planetary gear set having an input gear element, an output gear element and a reaction gear element, friction means connected to said reaction element for providing a resistance to rotation of said reaction element proportional to the force with which said friction means is engaged, biasing means acting on said friction means with a predetermined force to provide a predetermined reaction in said gearing, a cylinder connected to rotate with said output gear element, a piston in said cylinder, connecting means between said piston and said friction means, and means for supplying oil to said cylinder, said piston being responsive to centrifugal pressure of oil in said cylinder created by rotation of said cylinder to act on said friction means through said connecting means and oppose said biasing means to thereby reduce the net force of engagement of said friction means and thereby reduce the reaction in said gearing.

6. An accessory drive including a planetary gear set having an input gear element, an output gear element and a reaction gear element, means for holding said reaction gear element against rotation including a friction brake, resilient means for engaging said brake, an output shaft connected to rotate with said output member, a cylinder member surrounding said shaft and connected to rotate with the same, an annular piston reciprocably mounted on said shaft in said cylinder and connected to rotate with said cylinder and shaft, a spring acting with a predetermined force on one side of said piston to bias the piston in one direction, means for supplying oil into said cylinder on the other side of said piston, whereby rotation of said cylinder will create centrifugal oil pressure acting on said piston to urge it against said first spring, and means operatively connecting said piston to said brake, movement of said piston by centrifugal pressure sufficient to overcome said predetermined spring force acting through said connecting means to release said brake, whereby said brake is released upon said output shaft reaching a predetermined speed.

7. The accessory drive of claim 6 wherein predetermined movement of said piston by said centrifugal pressure establishes friction engagement of a surface on said piston with a surface on said reaction gear element, whereby movement of said piston more than a predetermined distance conditions said gearing for a one to one ratio drive between said input element and said output element.

8. The accessory drive of claim 6 wherein said connecting means includes a second spring having a spring rate greater than that of said first spring, a portion on said piston adapted to engage a portion on said reaction element for coupling said piston and said reaction element for common rotation, said second spring normally holding said portions separated, rotation of said output element above a predetermined speed creating centrifugal pressure sufficient to move said piston against both of said springs to establish coupling contact between said portions.

References Cited in the file of this patent

UNITED STATES PATENTS

| | | |
|---|---|---|
| 2,187,181 | Shackelford | Jan. 16, 1940 |
| 2,717,524 | Davis | Sept. 13, 1955 |
| 2,815,974 | Stubbe | Dec. 10, 1957 |